(12) United States Patent
Brummund et al.

(10) Patent No.: US 11,521,805 B2
(45) Date of Patent: Dec. 6, 2022

(54) MOTOR APPARATUS FOR A SWITCH DRIVE OF AN ELECTRICAL SWITCH, AND METHOD FOR OPERATION THEREOF

(71) Applicant: SIEMENS ENERGY GLOBAL GMBH & CO. KG, Munich (DE)

(72) Inventors: David Brummund, Berlin (DE); Thomas Hilker, Stahnsdorf (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 83 days.

(21) Appl. No.: 17/276,931

(22) PCT Filed: Aug. 27, 2019

(86) PCT No.: PCT/EP2019/072841
§ 371 (c)(1),
(2) Date: Mar. 17, 2021

(87) PCT Pub. No.: WO2020/057914
PCT Pub. Date: Mar. 26, 2020

(65) Prior Publication Data
US 2022/0037095 A1 Feb. 3, 2022

(30) Foreign Application Priority Data

Sep. 17, 2018 (DE) ...................... 10 2018 215 756.1

(51) Int. Cl.
*H01H 3/26* (2006.01)
*H02H 7/085* (2006.01)
(Continued)

(52) U.S. Cl.
CPC .............. *H01H 3/26* (2013.01); *H02H 7/085* (2013.01); *H02P 7/29* (2013.01); *H02P 27/08* (2013.01); *H01H 2003/266* (2013.01)

(58) Field of Classification Search
CPC .......... H02P 27/00; H02P 27/04; H02P 27/06; H02P 27/048; H02P 27/08; H02P 23/14;
(Continued)

(56) References Cited

U.S. PATENT DOCUMENTS 3,947,748 A * 3/1976 Klein ................... H02H 7/1225
363/57
4,723,099 A 2/1988 Herzig
(Continued)

FOREIGN PATENT DOCUMENTS

DE         19546628 A1     6/1997
DE     102007041972 B3     4/2009
(Continued)

*Primary Examiner* — Antony M Paul
(74) *Attorney, Agent, or Firm* — Laurence A. Greenberg; Werner H. Stemer; Ralph E. Locher

(57) ABSTRACT

A motor apparatus for a switch drive of an electric switch has an electric motor and a controller for controlling the electric motor. The controller has: a rectifier unit for rectifying a supply voltage of the motor apparatus, if the supply voltage is an alternating voltage, and for reverse polarity protection if the supply voltage is a direct voltage, a voltage measurement unit for detecting the supply voltage or a rectifier output voltage of the rectifier unit, a switch unit for generating a drive voltage for the electric motor from the supply voltage or from the rectifier output voltage and a control unit for controlling the switch unit as a function of the supply or rectifier output voltage detected. The electric motor is operable by direct current and the switch unit generates a drive direct voltage for the electric motor.

13 Claims, 4 Drawing Sheets

(51) Int. Cl.
*H02P 7/29* (2016.01)
*H02P 27/08* (2006.01)

(58) Field of Classification Search
CPC ...... H02P 29/00; H02P 29/025; H02P 29/032;
H02P 2201/11; H02P 2201/13; H02P
2201/07; H02P 2207/076; H02P 1/00;
H02P 1/04; H02P 1/16; H02P 1/24; H02P
1/26; H02P 1/28; H02P 1/42; H02P 1/46;
H02P 1/465; H02P 7/00; H02P 7/02;
H02H 7/08; H02H 7/12
See application file for complete search history.

(56) References Cited

U.S. PATENT DOCUMENTS

| | | | |
|---|---|---|---|
| 2005/0168891 | A1 | 8/2005 | Nilman-Johansson et al. |
| 2019/0237274 | A1 | 8/2019 | Hilker |

FOREIGN PATENT DOCUMENTS

| | | |
|---|---|---|
| DE | 102016218334 A1 | 3/2018 |
| EP | 0184059 B1 | 11/1988 |
| WO | WO 2009027477 A2 | 3/2009 |
| WO | WO 2012020285 A1 | 2/2012 |
| WO | WO 2018054672 A1 | 3/2018 |

* cited by examiner

MOTOR APPARATUS FOR A SWITCH DRIVE OF AN ELECTRICAL SWITCH, AND METHOD FOR OPERATION THEREOF

BACKGROUND OF THE INVENTION

Field of the Invention

The invention relates to a motor apparatus for a switch drive of an electrical switch and to a method for operating such a motor apparatus.

Electrical switches for closing or opening current paths of medium and high electrical voltages and currents need a large amount of mechanical energy to move switching contacts of the switches.

For example, switch drives which store mechanical energy, for example stored-energy spring mechanisms, are often used to move the switching contacts of circuit breakers. In a stored-energy spring mechanism, a spring, for example a helical spring, is often tensioned with a motor via a gear mechanism. The spring is locked against independent relaxation, with the result that the energy remains stored in the spring. A triggering apparatus can release the stored energy by releasing the locking of the spring, with the result that the spring relaxes. A switching action can therefore be carried out using the available stored energy.

Unlike circuit breakers, isolating switches cause a defined interruption of approximately load-free electrical circuits by driving switching contacts directly, for example by a motor. In this case, storage of energy is dispensed with since load-free (powerless) isolation of the switching contacts can be carried out more slowly.

The electrical supply voltages of electric motors for switch drives of electrical switches are diverse on account of normative specifications and application requirements and, in addition to the voltage level, also differ in terms of the type of voltage which may be, for example, a single-phase or three-phase AC voltage or a DC voltage. Therefore, different motor types and designs are used for switch drives of electrical switches. Control, protection, locking and monitoring functions for the motors are implemented by means of a multiplicity of component and wiring variants. The component and wiring variance increases the costs and the error rate involved in installing the motors.

The document DE 10 2016 218 334 A1 discloses a motor apparatus for a switch drive of an electrical switch described above. The motor apparatus comprises a brushless electric motor and an electronic control apparatus for controlling the electric motor; the control apparatus in turn comprises: (i) a rectifier unit for rectifying a supply voltage of the motor apparatus if the supply voltage is an AC voltage and for polarity reversal protection if the supply voltage is a DC voltage, (ii) a voltage measuring unit for capturing a rectifier output voltage of the rectifier unit, (iii) a switching unit for generating a pulse-width-modulated AC drive voltage for the electric motor directly from the supply voltage or the rectifier output voltage of the rectifier unit, and (iv) a control unit for controlling the switching unit on the basis of the captured supply voltage or rectifier output voltage.

SUMMARY OF THE INVENTION

The invention is based on the object of specifying a motor apparatus for a switch drive of an electrical switch and a corresponding operating method, in which the motor apparatus can be operated with different supply voltage and motor voltage levels and can be produced in a simple and favorable manner.

The object is achieved, according to the invention, by means of the features as claimed.

The subclaims relate to advantageous configurations of the invention.

A motor apparatus according to the invention for a switch drive of an electrical switch comprises an electric motor and a control apparatus for controlling the electric motor, wherein the control apparatus in turn has the following components: (i) a rectifier unit for rectifying a supply voltage of the motor apparatus if the supply voltage is an AC voltage and for polarity reversal protection if the supply voltage is a DC voltage, (ii) a voltage measuring unit for capturing the supply voltage or a rectifier output voltage of the rectifier unit, (iii) a switching unit for generating a drive voltage for the electric motor from the supply voltage or from the rectifier output voltage of the rectifier unit, and (iv) a control unit for controlling the switching unit on the basis of the captured supply voltage or rectifier output voltage. Provision is made for the electric motor to be an electric motor which can be operated with direct current, and for the switching unit to be a switching unit for generating a DC drive voltage for this electric motor which can be operated with direct current. The DC drive voltage may be in the form of a continuous DC voltage or a modulated DC voltage. Using an electric motor which can be operated with direct current and a corresponding DC drive voltage as the drive voltage makes it possible, with the same functionality, for at least the switching unit for generating the drive voltage to have a considerably simpler structure and therefore to also be more inexpensive than the switching units known from the prior art.

Such a motor apparatus can be advantageously operated with different supply voltages, in which case the supply voltages may differ in terms of their amplitude and/or type of voltage. The rectifier unit enables selective operation with a single-phase or multiphase AC supply voltage or a DC supply voltage of any polarity by virtue of it rectifying an AC supply voltage and providing polarity reversal protection for a DC supply voltage. The practice of generating a DC drive voltage for the electric motor from the predefined supply voltage makes it possible to adapt the DC drive voltage for the electric motor to the respective supply voltage and to the requirements of the components to be driven. This achieves extensive independence of the motor apparatus from the amplitude and type of the supply voltage and from the components to be driven, with the result that the motor apparatus can be used for switch drives of different electrical switches, for example for tensioning springs of the stored-energy spring mechanisms of circuit breakers or for directly driving switching contacts of isolating switches. In particular, it is possible to advantageously reduce the number of motor variants for different switches. Instead of different electric motors, an electric motor which can be operated with direct current is used for different switches. The invention also advantageously reduces the modification effort when subsequently adapting the supply voltage. In terms of production, the installation and wiring of different electrical components for monitoring and controlling the electric motor are dispensed with, in particular. The associated standardization also reduces an error probability during these production processes.

According to one preferred embodiment of the invention, the electric motor which can be operated with direct current is a DC motor which can be operated solely with direct current or a series-wound motor. The series-wound motor is also known by the term universal motor and can be operated both with direct current and with alternating current.

According to a further preferred embodiment of the invention, the switching unit is in the form of a simplified buck converter or comprises a simplified buck converter. The buck converter, also called a step-down converter, is a relatively simple form of a switching DC-DC converter. The output voltage of the buck converter is always lower than the absolute value of the input voltage of the buck converter.

According to yet another preferred embodiment of the invention, the switching unit is connected downstream of the rectifier unit or the rectifier unit has the switching unit. In the first case, the rectifier unit and the switching unit are separate and the result is a type of intermediate circuit between the two units. In this case, the voltage measuring unit captures the rectifier output voltage of the rectifier unit. In the second case, the rectifying function and the switching function are performed in one unit, the rectifier unit. Accordingly, the voltage measuring unit captures the supply voltage in this case.

One configuration of the invention provides for the control apparatus to have a current measuring unit for capturing a motor current flowing between the switching unit and the electric motor which can be operated with direct current. This configuration of the invention advantageously makes it possible to monitor the motor current in order to detect overloads and malfunctions of the electric motor.

A further configuration of the invention provides for the control apparatus to have a DC isolating unit for the DC isolation of the electric motor which can be operated with direct current from the control apparatus. For example, the DC isolating unit has a relay or a contactor for the DC isolation of the electric motor from the control apparatus. This configuration of the invention advantageously makes it possible to safely switch off the electric motor if an overload or malfunction is detected.

A further configuration of the invention provides for the control unit to have an input assembly, via which input signals from at least one external device can be supplied or are supplied to the control unit. In particular, input signals from a limit switch for capturing an end position of the switch drive are supplied to the control unit via the input assembly. This configuration of the invention advantageously makes it possible to process input signals relevant to the operation of the respective switch using the control unit. For example, the control apparatus can thereby react to input signals such as locking requests for locking the switch drive and can disconnect the electric motor if necessary. Input signals from a limit switch for capturing an end position of the switch drive with respect to the switching unit make it possible, in particular, to monitor an end position of the switch drive using the control unit.

A further configuration of the invention provides for the control unit to have an output assembly, via which output signals are output by the control unit to at least one external device. This configuration of the invention advantageously makes it possible to output a state of the electric motor and/or of the control apparatus using the output signals and to process it further in other assemblies, for example in conventional electrical control components.

In the method according to the invention for operating a motor apparatus mentioned above, provision is made
  for the rectifier unit to be used to rectify a supply voltage of the motor apparatus if the supply voltage is an AC voltage and to provide polarity reversal protection if the supply voltage is a DC voltage,
  for the voltage measuring unit to be used to capture the supply voltage of the motor apparatus or the output voltage of the rectifier unit, and
  for the switching unit to be used to generate a drive voltage for the electric motor which can be operated with direct current, wherein the switching unit is controlled by means of the control unit on the basis of the supply voltage or rectifier output voltage captured by means of the voltage measuring unit. The advantages of the method according to the invention accordingly emerge in a manner corresponding to the advantages of the motor apparatus according to the invention which have already been mentioned above.

One configuration of the method provides for the control unit to be used to generate a pulse-width-modulated DC drive voltage for the electric motor which can be operated with direct current.

A further configuration of the method provides for an amplitude of a motor current flowing between the switching unit and the electric motor which can be operated with direct current to be captured, for an amplitude threshold value to be predefined and for the electric motor which can be operated with direct current to be switched off if the captured amplitude of the motor current exceeds the amplitude threshold value. This makes it possible to advantageously prevent the flow of an excessively high motor current.

Yet another configuration of the method provides for a period during which a motor current flows between the switching unit and the electric motor which can be operated with direct current to be captured, for a time threshold value to be predefined and for the electric motor which can be operated with direct current to be switched off if the captured period exceeds the time threshold value. This makes it possible to advantageously prevent the flow of the motor current during an excessively long period.

The above-described properties, features and advantages of this invention and the manner in which they are achieved become clearer and more distinctly comprehensible in connection with the following description of exemplary embodiments which are explained in more detail in connection with the drawings, in which:

DETAILED DESCRIPTION OF THE INVENTION

Figure 1:
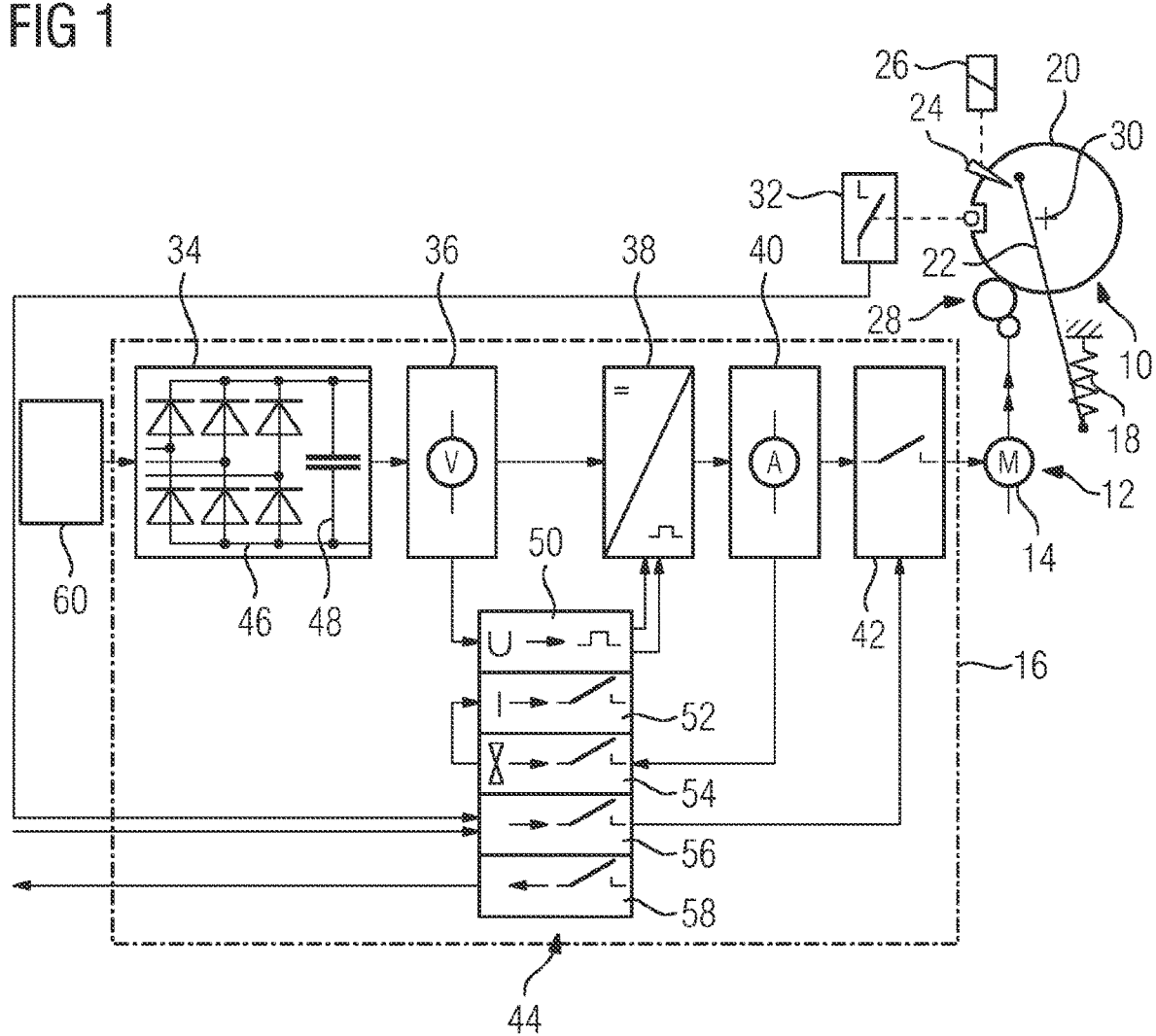
FIG. 1 shows a block diagram of a switch drive of an electrical switch and a motor apparatus according to a first embodiment of the invention.

FIG. 1 shows a block diagram of a switch drive 10 of an electrical switch and a motor apparatus 12 for this switch drive 10. The motor apparatus 12 has an electric motor 14 which can be operated with direct current and an electronic control apparatus 16 for controlling this electric motor 14. In the example shown, the switch drive 10 is a stored-energy spring mechanism and has a spring 18, a tensioning wheel 20, a coupling element 22 connecting the spring 18 to the tensioning wheel 20, a locking unit 24 and a triggering unit 26. The electric motor 14 which can be operated with direct current may be a universal, series-wound, shunt-wound or permanently excited DC motor. For the sake of simplicity, it is referred to as an electric motor 14 for short below.

The electric motor 14 is coupled to the tensioning wheel 20 by means of a gear mechanism 28 in order to rotate the tensioning wheel 20 about an axis of rotation 30 in a first direction of rotation from a first end position into a second end position. The coupling element 22 is in the form of a coupling rod which is connected to the tensioning wheel 20 at one end and is connected to the spring 18 at the other end, with the result that the spring 18 is tensioned by rotating the tensioning wheel 20 about the axis of rotation 30 in the first direction of rotation.

The spring 18 can therefore be tensioned by the electric motor 14. The tensioning wheel 20 can be locked by the locking unit 24, with the result that rotation of the tensioning wheel 20 is blocked in order to prevent relaxation of the spring 18. For example, the locking unit 24 has, for this purpose, a locking armature which arrests the tensioning wheel 20 and/or the coupling element 22 in the second end position in which the spring 18 is tensioned.

The locking of the tensioning wheel 20 can be canceled by the triggering unit 26 in order to enable relaxation of the spring 18. As a result of the relaxation of the spring 18, the tensioning wheel 20 is rotated from the second end position into the first end position and a switching contact (not illustrated) of the switch is moved in order to interrupt a current path. The end positions of the tensioning wheel 20 are captured by a limit switch 32.

The control apparatus 16 has a rectifier unit 34, a voltage measuring unit 36, a switching unit 38, a current measuring unit 40, a DC isolating unit 42 and a control unit 44. The rectifier unit 34 comprises a rectifier circuit 46 and a capacitor 48 which is connected downstream of the rectifier circuit 46, can be interpreted as an intermediate circuit capacitor and forms the input of a corresponding intermediate circuit in which the voltage measuring unit 36 is connected. The control unit 44 has a pulse width modulation unit 50, a disconnecting unit 52, a time and current monitoring unit 54, an input assembly 56 and an output assembly 58. A microcontroller preferably forms the control unit 44.

The rectifier unit 34 is connected to a supply voltage source 60 which supplies the motor apparatus 12 with a supply voltage U0. The supply voltage source 60 is a single-phase or multiphase AC voltage source or a DC voltage source.

The rectifier unit 34 is used to rectify the supply voltage U0 if the supply voltage U0 is an AC voltage and to provide polarity reversal protection if the supply voltage U0 is a DC voltage, with the result that the rectifier unit 34 outputs a rectifier output voltage Ui which is a DC voltage with a predefined polarity. A polarity of a supply voltage U0, which is a DC voltage, or a polarity of a component of a supply voltage U0, which is an AC voltage, that differs from the predefined polarity is converted by the rectifier unit 34 into the predefined polarity.

The voltage measuring unit 36 is used to capture an amplitude of the rectifier output voltage Ui. The voltage measuring unit 36 is an electrical or electronic circuit for determining the voltage and has a voltage divider, for example. In this exemplary embodiment, it is connected in such a manner that it determines the amplitude of the rectifier output voltage (intermediate circuit voltage) Ui.

The switching unit 38 is used to generate a pulse-width-modulated drive voltage Uou for the electric motor 14 from the rectifier output voltage Ui. For this purpose, the switching unit 38 is controlled by means of the control unit 44 on the basis of the amplitude of the rectifier output voltage Ui that is captured using the voltage measuring unit 36.

The current measuring unit 40 is used to capture a motor current flowing between the switching unit 38 and the electric motor 14. The current measuring unit 40 has a converter coil or a shunt resistor, for example.

The DC isolating unit 42 can be used to DC-isolate the electric motor 14 from the control apparatus 16. The isolating unit 42 has, for example, a relay or a contactor for the DC isolation of the electric motor 14 and the control apparatus 16.

The pulse width modulation unit 50 of the control unit 44 is used to generate pulse width modulation signals on the basis of the rectifier output voltage Ui, which pulse width modulation signals are used to control the switching unit 38.

The time and current monitoring unit 54 of the control unit 44 is used to evaluate the motor current captured by the current measuring unit 40. In this case, an amplitude of the motor current and a period during which the motor current flows are determined.

The disconnecting unit 52 of the control unit 44 is used to disconnect the motor current via the switching unit 38 if the amplitude of the motor current exceeds a predefined amplitude threshold value or if the period during which the motor current flows exceeds a predefined time threshold value.

Input signals from at least one external device (with respect to the control apparatus) can be supplied to the control unit 44 via the input assembly 56 of the control unit 44. In particular, input signals from the limit switch 32 can be supplied to the control unit 44 via the input assembly 56. The isolating unit 42 is activated by the input assembly 56 on the basis of input signals in order to DC-isolate the electric motor 14 from the control apparatus 14.

Output signals can be output by the control unit 44 to at least one external device via the output assembly 58. A state of the electric motor 14 and/or a state of the control apparatus 16 and/or a state of the switch drive 10 is/are transmitted using an output signal, for example.

Figure 2:
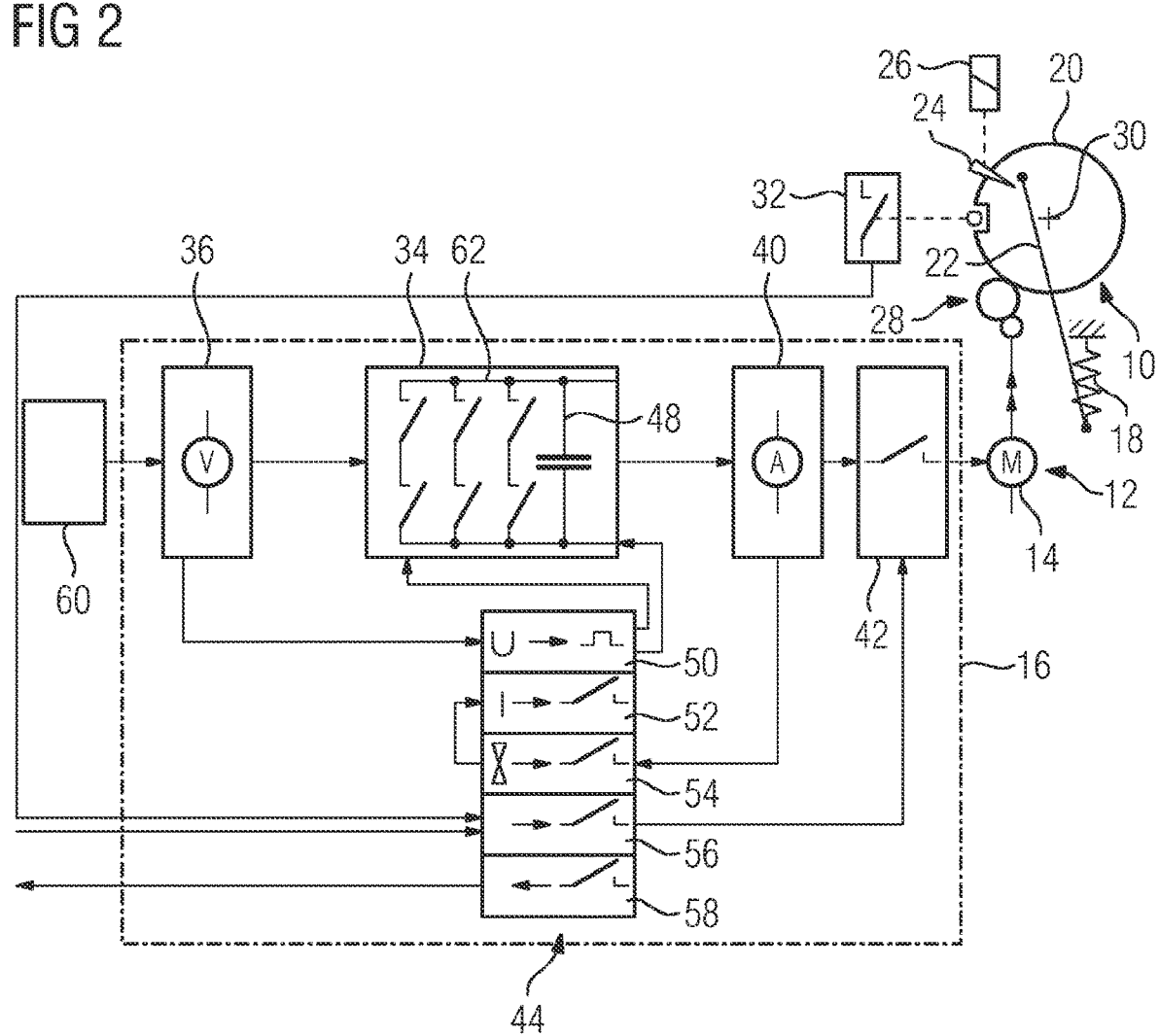
FIG. 2 shows a block diagram of a switch drive of an electrical switch and a motor apparatus according to a second embodiment of the invention.

FIG. 2 shows a block diagram of the switch drive 10 for the electrical switch and a motor apparatus 12 for the switch drive 10 with an alternatively configured control apparatus 16. In other words, only the control apparatus 16 is therefore configured differently than in the example in FIG. 1. However, since the two configurations of the control apparatuses 16 (in FIGS. 1 and 2) have a very large number of common features, only the differences shall be discussed here.

The most striking difference is the relationship of the rectifier unit 34 and the switching unit 38, 62. Whereas the switching unit 38 is connected downstream of the rectifier unit 34 in the control apparatus 16 shown in FIG. 1, the rectifier unit 34 in FIG. 2 has the switching unit 62. In other words, in the example in FIG. 2, the rectifying and switching functions are performed in one unit, the rectifier unit 34, which also comprises the capacitor 48 in addition to the switching unit 62. The capacitor 48 is used as a smoothing capacitor.

Since the voltage measuring unit 36 is intended to measure a voltage proportional to the supply voltage U0, but there is no "intermediate circuit" between the rectifier unit 34 and the switching unit 62, the voltage measuring unit 36 is now connected in such a manner that it can itself measure/measures the supply voltage U0.

The pulse width modulation unit 50 of the control unit 44 is now used to generate pulse width modulation signals on the basis of the supply voltage U0, which pulse width modulation signals are used to control the switching unit 62.

The current measuring unit 40 is again used to capture the motor current flowing between the switching unit 62 and the electric motor 14. Since the capacitor 48 is connected at the output of the switching unit 62 in the rectifier unit 34, the current is measured by means of the current measuring unit 40 downstream of the rectifier unit 34, that is to say downstream of the capacitor 48.

One of the tasks of the electronic control apparatus 16 is to generate a DC voltage which sets the desired operating point of the electric motor 16. This DC voltage is the DC drive voltage Uou.

For this purpose, the supply voltage U0 which has the correct polarity and is possibly rectified is modulated by switching the switching unit 38, 62 ON and OFF in a controlled manner such that a pulsating square-wave voltage arises, the relative pulse width of which is proportional to the required mean DC voltage value.

The operation of switching the elements of the switching unit 38, 62 ON and OFF in good time is controlled by the control unit 44. In this case, control is effected, in particular, via the pulse width modulation unit 50 of this control unit 44. A further task of the electronic control is to adapt the relative width of the voltage pulses to the intermediate circuit voltage Ui. If the intermediate circuit voltage Ui rises, the relative width of the voltage pulses is reduced. If the intermediate circuit voltage Ui decreases, the relative width of the voltage pulses is increased. In this manner, the electrical power which is introduced into the electric motor 14 is adapted to the required power and is limited to the maximum permissible power.

Figure 3:
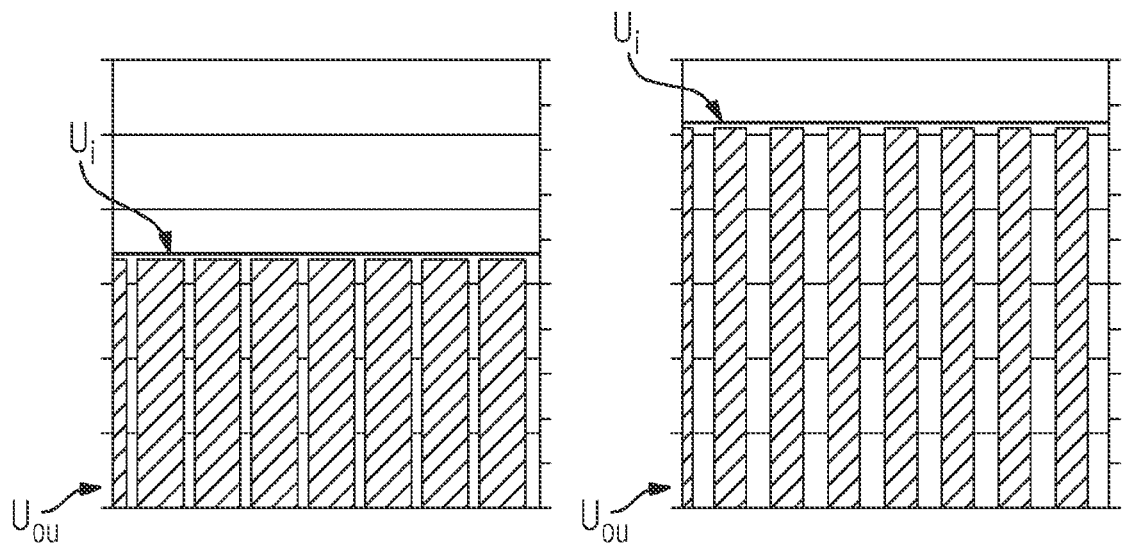
FIG. 3 shows two diagram with voltages which occur in the motor apparatus.

The left-hand side of FIG. 3 shows an intermediate circuit voltage Ui with a pulse-width-modulated output voltage, and a considerably larger voltage and its associated pulse-width-modulated output voltage with a smaller duty ratio are shown on the right. The same mean value of the output voltage results for the two output voltages. In this manner, an equivalent drive voltage Uou can therefore be generated for the electric motor 14 for different supply voltages U0 or for a changing supply voltage U0.

Figure 4:
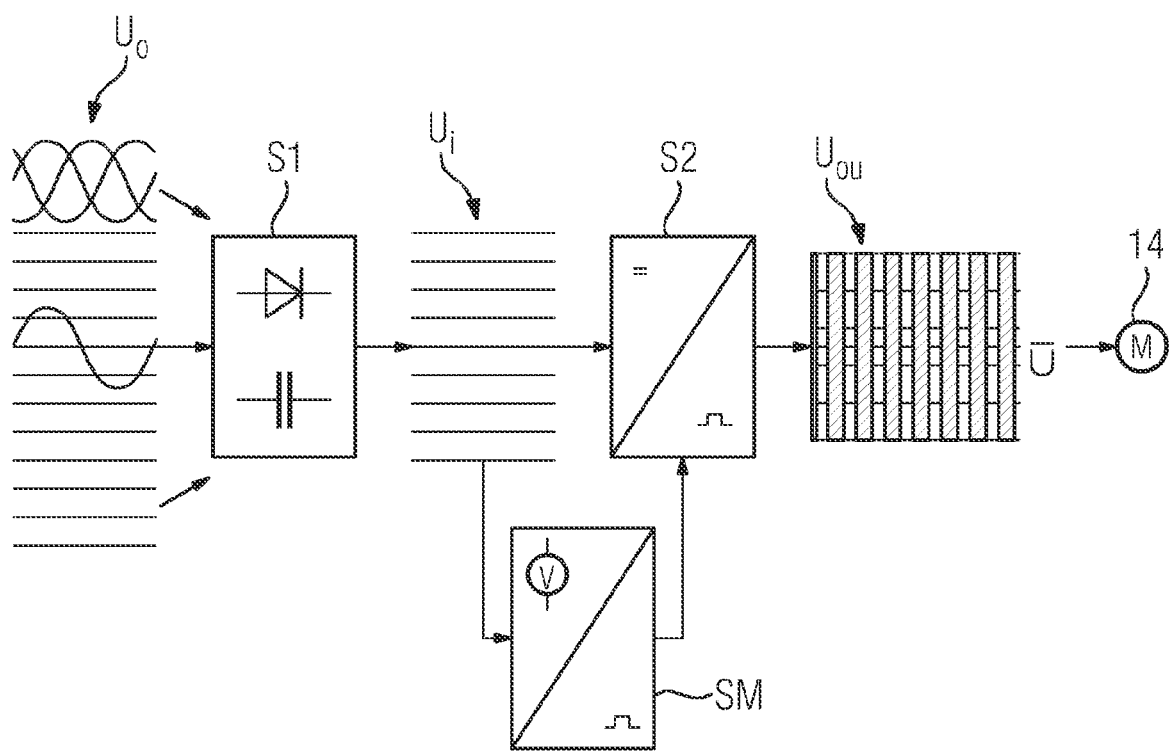
FIG. 4 shows the operating process which takes place in the motor apparatus in FIG. 1.

The process which is illustrated in a simplified form in FIG. 4 and takes place in the motor apparatus 12 in FIG. 1 results from the combination of electronic control and an electric motor 14.

The supply voltage U0 of a defined permissible range and virtually any desired type of voltage feeds the input of the electronic control apparatus 16. The voltage U0 is rectified in step S1 and is measured in a measurement step SM. The parameterization of the pulse width is carried out on the basis of the measurement result and is converted into a control signal. The control signal controls a buck conversion which converts the rectified intermediate circuit voltage Ui into a pulse-width-modulated DC voltage with a mean DC voltage value corresponding to the operating point of the electric motor 14 (step S2). This then supplies the electric motor 14.

Figure 5:
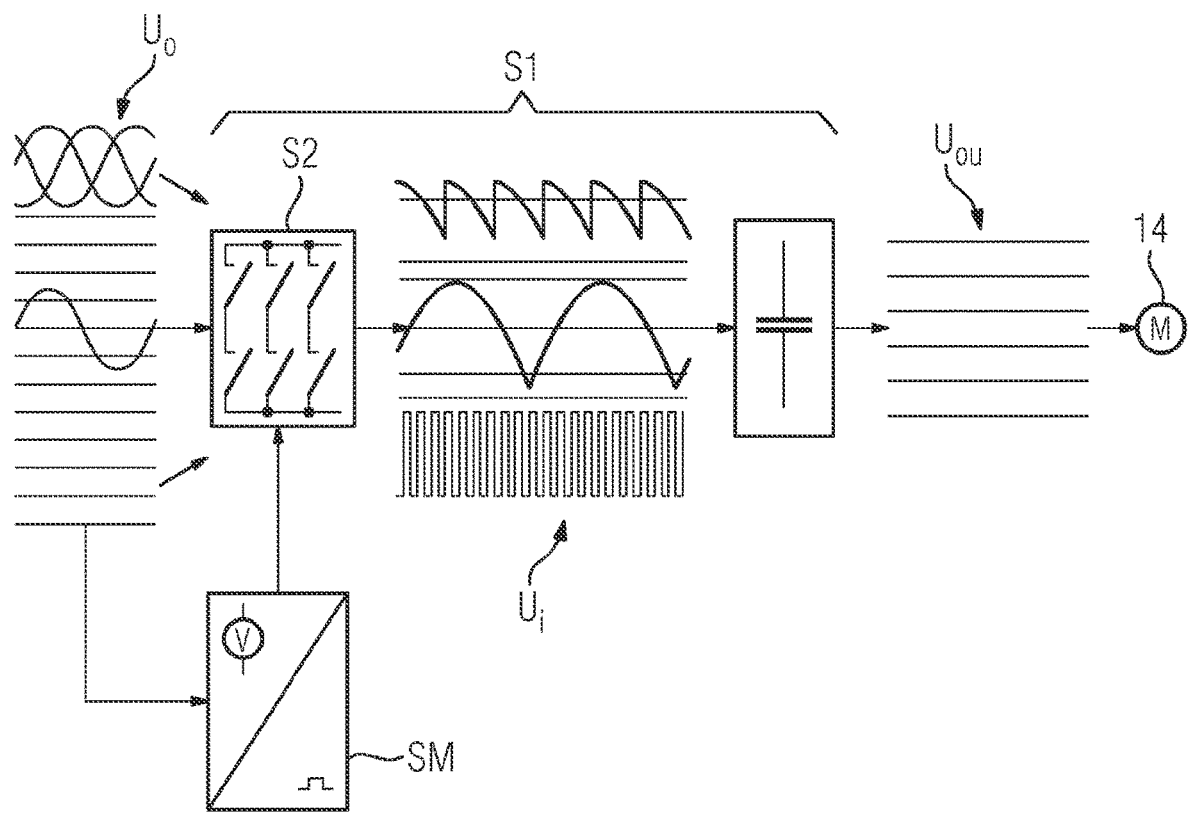
FIG. 5 shows the operating process which takes place in the motor apparatus in FIG. 2.

Alternatively, the process which is illustrated in a simplified form in FIG. 5 and takes place in the motor apparatus 12 in FIG. 2 results. In this case, the level and type of the supply voltage U0 are measured in an upstream measurement step SM before rectification which is carried out in step S1. In this case, AC voltages are rectified in a controlled manner or DC voltages are switched on in a clocked manner. The voltage level of the intermediate circuit is therefore adapted to the power requirements of the electric motor 14 (step S2) and is smoothed by means of the capacitor 48.

Figure 6:
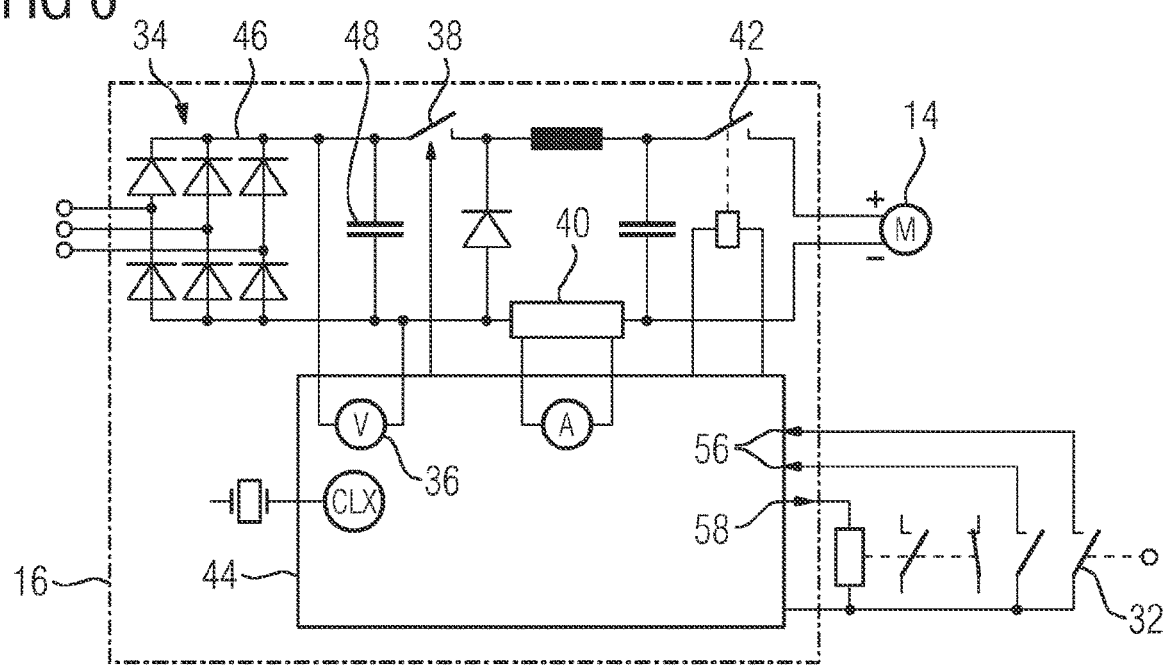
FIG. 6 shows a schematic circuit diagram of the motor apparatus shown in FIG. 1.

FIG. 6 shows a circuit diagram of the exemplary embodiment of the motor apparatus 12 shown in FIG. 1, in which case some of the configurations mentioned in connection with FIG. 1 are now explicitly illustrated again. The switching unit 38 is thus illustrated as a buck converter and the DC isolating unit 42 is illustrated as a relay. An LC low-pass filter is interposed between the buck converter and the DC isolating unit 42. Furthermore, the specific electrical connection and polarity of the electric motor 14 which can be operated with direct current (DC motor) are now also indicated and the converter coil of the current measuring unit 40 can be seen. The supply voltage U0 is a three-phase supply voltage U0 here. The rectifier unit 34 is accordingly a three-phase rectifier unit.

LIST OF REFERENCE SIGNS

10 Switch drive
12 Motor apparatus
14 Electric motor
16 Control apparatus
18 Spring
20 Tensioning wheel
22 Coupling element
24 Locking unit
26 Triggering unit
28 Gear mechanism
30 Axis of rotation
32 Limit switch
34 Rectifier unit
36 Voltage measuring unit
38 Switching unit
40 Current measuring unit
42 DC isolating unit
44 Control unit
46 Rectifier circuit
48 Capacitor
50 Pulse width modulation unit
52 Disconnecting unit
54 Time and current monitoring
56 Input assembly
58 Output assembly
60 Supply voltage source
62 Switching unit
U0 Supply voltage
Ui Rectifier output voltage
Uou Drive voltage
S1 Rectification step
S2 Voltage conversion step
SM Measurement step

The invention claimed is:
1. A motor apparatus for a switch drive of an electrical switch, the motor apparatus comprising:
an electric motor to be operated with direct current;
a control apparatus for controlling said electric motor, said control apparatus having:
a rectifier unit for rectifying a supply voltage of the motor apparatus if the supply voltage is an AC voltage and for polarity reversal protection if the supply voltage is a DC voltage;
a voltage measuring unit for capturing the supply voltage or a rectifier output voltage of said rectifier unit;

a switching unit for generating a DC drive voltage for said electric motor from the supply voltage or from the rectifier output voltage; and a control unit for controlling said switching unit based on the supply voltage or rectifier output voltage captured by said voltage measuring unit.

2. The motor apparatus according to claim 1, wherein said electric motor to be operated with direct current is a DC motor or a series-wound motor.

3. The motor apparatus according to claim 1, wherein said switching unit is a buck converter or comprises a buck converter.

4. The motor apparatus according to claim 1, wherein said switching unit is connected downstream of said rectifier unit or said rectifier unit includes said switching unit.

5. The motor apparatus according to claim 1, wherein said control apparatus has a current measuring unit for capturing a motor current flowing between said switching unit and said electric motor.

6. The motor apparatus according to claim 1, wherein said control apparatus has a DC isolating unit for a DC isolation of said electric motor from said control apparatus.

7. The motor apparatus according to claim 1, wherein said control unit has an input assembly configured for supplying input signals from at least one external device to said control unit.

8. The motor apparatus according to claim 7, wherein said input assembly is configured for supplying input signals from a limit switch for capturing an end position of the switch drive to said control unit.

9. The motor apparatus according to claim 1, wherein said control unit includes an output assembly configured for outputting output signals from said control unit to at least one external device.

10. A method of operating a motor apparatus, the method comprising:

providing an electric motor to be operated by direct current;

using a rectifier unit to rectify a supply voltage of the motor apparatus if the supply voltage is an AC voltage and to provide polarity reversal protection if the supply voltage is a DC voltage;

acquiring with a voltage measuring unit the supply voltage of the motor apparatus or an output voltage of the rectifier unit; and using a switching unit to generate a drive voltage for the electric motor, and controlling the switching unit with a control unit on a basis of the supply voltage or rectifier output voltage acquired by the voltage measuring unit.

11. The method according to claim 10 configured for operating the motor apparatus according to claim 1.

12. The method according to claim 10, which comprises acquiring an amplitude of a motor current flowing between the switching unit and the electric motor being operated with direct current, and switching off the electric motor when the acquired amplitude of the motor current exceeds a predefined amplitude threshold value.

13. The method according to claim 10, which comprises acquiring a time period during which a motor current flows between the switching unit and the electric motor, and switching off the electric motor when the captured period exceeds a predefined time threshold value.

* * * * *